US007187656B2

(12) United States Patent
Lazarus et al.

(10) Patent No.: US 7,187,656 B2
(45) Date of Patent: Mar. 6, 2007

(54) METHOD AND SYSTEM FOR PROCESSING TONES TO REDUCE FALSE DETECTION OF FAX AND MODEM COMMUNICATIONS

(75) Inventors: David B. Lazarus, Elkins Park, PA (US); David P. Resuta, Chalfont, PA (US); Phillip K. Freyman, Elgin, IL (US)

(73) Assignee: General Instrument Corporation, Horsham, PA (US)

( * ) Notice: Subject to any disclaimer, the term of this patent is extended or adjusted under 35 U.S.C. 154(b) by 1058 days.

(21) Appl. No.: 10/138,220

(22) Filed: May 2, 2002

(65) Prior Publication Data
US 2003/0206563 A1   Nov. 6, 2003

(51) Int. Cl.
*H04J 1/16* (2006.01)

(52) U.S. Cl. ...................... 370/252; 370/400; 379/386; 704/233

(58) Field of Classification Search ........ 370/352–356, 370/400, 401, 252; 379/88.17, 355, 201.01, 379/386, 100; 704/233
See application file for complete search history.

(56) References Cited

U.S. PATENT DOCUMENTS

| 5,392,348 | A |   | 2/1995  | Park et al. ............... 379/386 |
| 5,521,967 | A | * | 5/1996  | Novas et al. .......... 379/100.14 |
| 6,154,721 | A | * | 11/2000 | Sonnic ..................... 704/233 |
| 6,259,691 | B1 |  | 7/2001  | Naudus ................... 370/352 |
| 6,504,838 | B1 | * | 1/2003  | Kwan ...................... 370/352 |
| 2005/0276411 | A1 | * | 12/2005 | LeBlanc ............... 379/406.05 |

FOREIGN PATENT DOCUMENTS

| EP | 1044558 B1 | 11/2003 |
| EP | 0867856 B1 | 10/2005 |
| WO | WO 00/77992 A1 | 12/2000 |
| WO | WO 01/28256 A1 | 4/2001 |

OTHER PUBLICATIONS

PCT International Search Report for PCT/US03/13148, mailed Aug. 8, 2003, 6 pages.

* cited by examiner

*Primary Examiner*—John Pezzlo
(74) *Attorney, Agent, or Firm*—Larry T. Cullen

(57) ABSTRACT

A tone processing method and communications system which reduce the probability of falsely detecting modem and facsimile communications that occur on a communications link. The link connects a calling endpoint to an answering endpoint. In a preferred embodiment, when the answering endpoint goes off-hook in response to receiving a call from the calling endpoint, an elapse of time is measured while monitoring the link. If a predetermined amount of time elapses without detecting at least one tone on the link, tone detection criteria is modified to reduce tone detection sensitivity, or to ignore tones altogether. In another embodiment, the tone detection criteria is similarly modified if voice activity is detected on the link. In yet another embodiment, when tones and voice activity occur at different times during a call, at least one characteristic is modified to optimize the link for the type of communications occurring on the link.

16 Claims, 5 Drawing Sheets

METHOD AND SYSTEM FOR PROCESSING TONES TO REDUCE FALSE DETECTION OF FAX AND MODEM COMMUNICATIONS

BACKGROUND OF THE INVENTION

1. Field of the Invention

The present invention generally relates to the monitoring of signals (e.g., voice and tones) transmitted over a communications link, and optimizing tone processing parameters based on the type and timing of the monitored signals.

2. Background Information

Cable-based IP telephony is a simplified and consolidated communication service that can be provided at a lower cost than consumers currently pay to separate Internet, television and telephony service providers. The use of the Internet for real-time voice applications is rapidly increasing. The goal of Internet Protocol (IP) telephony employing cable modem technology is to combine telephony, video, and data signals over a cable distribution infrastructure.

The Voice over IP (VoIP) gateway bridges the public switched telephone network (PSTN) or integrated services digital network (ISDN) with the packet-switched data network (TCP/IP based Network). Such a VoIP gateway is configured to provide IP call control and IP data transport, which includes the compression and decompression of voice channels. VoIP is a relatively new service capable of being supported by Data Over Cable Systems Interface Specification (DOCSIS) cable networks. DOCSIS describes a standard for the cable modem interface between a cable TV operator and a computer.

DOCSIS has been accepted as the standard for devices that handle incoming and outgoing data signals across this interface. DOCSIS 1.0 was ratified by the International Telecommunication Union (ITU) in March 1998. Cable modems conforming to DOCSIS are available in many areas where cable operators operate. DOCSIS is an evolving standard which specifies modulation schemes and protocols for exchange of bidirectional signals over cable, allowing version 4 IP traffic to achieve transparent transfer between the Cable Modem Termination System-Network Side Interface (CMTS-NSI) and the Cable Modem to Customer Premise Equipment Interface (CMCI). Upgrades to existing cable modems and DSPs to maximize VoIP quality can be achieved by changing the programming in their EEPROM flash memory.

IP telephony links supporting modems and faxes often falsely detect modems and fax tones. Such a false detection can cause system parameters to be adjusted for fax/modem operation, rather than for voice. The detection of false tones can occur due to background noise detected during voice communications between users of a communications system. Such background noise may include modem tones outputted by a speaker in the same room as a user who is verbally conversing with another user over a communications link. Modem, fax or other tones can sometimes be heard during a television program or radio show. The false detection of one or more modem or fax tones (e.g., 2100 Hz signals), commonly found in music and other noise sources, can be disruptive to a normal voice conversation taking place over an IP telephony link, because the system monitoring the link automatically makes adjustments to support fax and modem communications.

SUMMARY OF THE INVENTION

The present invention reduces or eliminates the false detection of fax and modem tones transmitted over a communications link. A predetermined time limit is established for accepting detected tones as being valid. The time that elapses from when a phone call is answered (i.e., the answering phone line is picked up, the answering terminal is taken off-hook) is measured. Tones, detected after the elapsed time reaches the predetermined time limit, are processed in a different manner than before the time limit is reached (e.g., the tones are ignored, or tone detection sensitivity is reduced). Thus, it is assumed that valid fax and modem tone detection always occurs during the beginning (i.e., the first few seconds) of a phone call.

In a preferred embodiment, the present invention is a method of processing tones. The method is implemented in a communications system including a communications link that connects a calling endpoint to an answering endpoint. When the answering endpoint is detected to go off-hook in response to receiving a call from the calling endpoint, the elapse of time from when the answering endpoint goes off-hook is measured. The communications link is monitored for an occurrence of at least one tone. If the time reaches a predetermined value without the occurrence of at least one tone on the communications link, at least one detection criteria parameter that is used by the communications system to process tones that occur on the communications link is modified.

The modified detection criteria parameter may cause tones that occur on the communications link to be ignored, or the sensitivity of detecting the tones may be reduced. If at least one tone occurs on the communications link, a parameter associated with the transmission characteristics of the communications link may be adjusted, so as to optimize the communications link for fax/modem operation. The transmission characteristic parameter may be a signal delay parameter, an echo cancellation parameter, a jitter buffer parameter (e.g., associated with the size of the jitter buffer), a packetization period or a wave/voice coder selection parameter. The parameter may be associated with a vocoder that detects voice activity on the communications link (e.g., the rate of the vocoder). The parameter may be associated with the bandwidth of the communications link.

In an alternate embodiment of the present invention, the communications link is monitored for an occurrence of voice activity. If voice activity occurs on the communications link, at least one detection criteria parameter that is used to process tones that occur on the communications link is modified.

In yet another embodiment of the present invention, tones which occur on a communications link are processed by monitoring the communications link for an occurrence of at least one tone and voice activity. When an occurrence of voice activity on the communications link is detected, the sensitivity of detecting tones that occur on the communications link is reduced.

The communications link may initially have a plurality of transmission characteristics that are optimized for voice communications. When an occurrence of at least one tone on the communications link is detected, at least one of the transmission characteristics of the communications link may be modified, so as to optimize the communications link for fax/modem operation.

An occurrence of voice activity on the communications link may be detected after the at least one of the transmission characteristics of the communications link is modified to optimize the communications link for fax/modem operation. At least one of the transmission characteristics of the communications link may be modified in response to the detection of the occurrence of the voice activity, so as to optimize the communications link for voice communications.

A communications system operating in accordance with the present invention includes an off-hook detector and timer circuit, a tone detector, a voice activity detector (VAD), and a processor. The processor is in communications with the off-hook detector and timer circuit, the tone detector and the VAD. The off-hook detector and timer circuit is used to detect the answering endpoint going off-hook in response to receiving a call from the calling endpoint. The off-hook detector and timer circuit is also used to measure the elapse of time from when the answering endpoint goes off-hook. The tone detector is used to detect tones that occur on the communications link. The VAD is used to detect the occurrence of voice activity on the communications link. The processor executes an algorithm to modify at least one detection criteria parameter that is used by the system to process tones that occur on the communications link.

The algorithm may instruct the processor to modify the detection criteria parameter if voice activity is detected by the VAD. The algorithm may instruct the processor to modify the detection criteria parameter if the time reaches a predetermined value without the tone detector detecting a tone. The algorithm may instruct the processor to modify the detection criteria parameter so that tones that occur on the communications link are processed differently than before the time reaches the predetermined value.

The communications system may additionally include a voice coder in communication with the processor. The detection criteria parameter may be modified to adjust at least one algorithm implemented by the voice coder. The communications system may be an Internet telephone system.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DETAILED DESCRIPTION OF THE INVENTION

Figure 1:
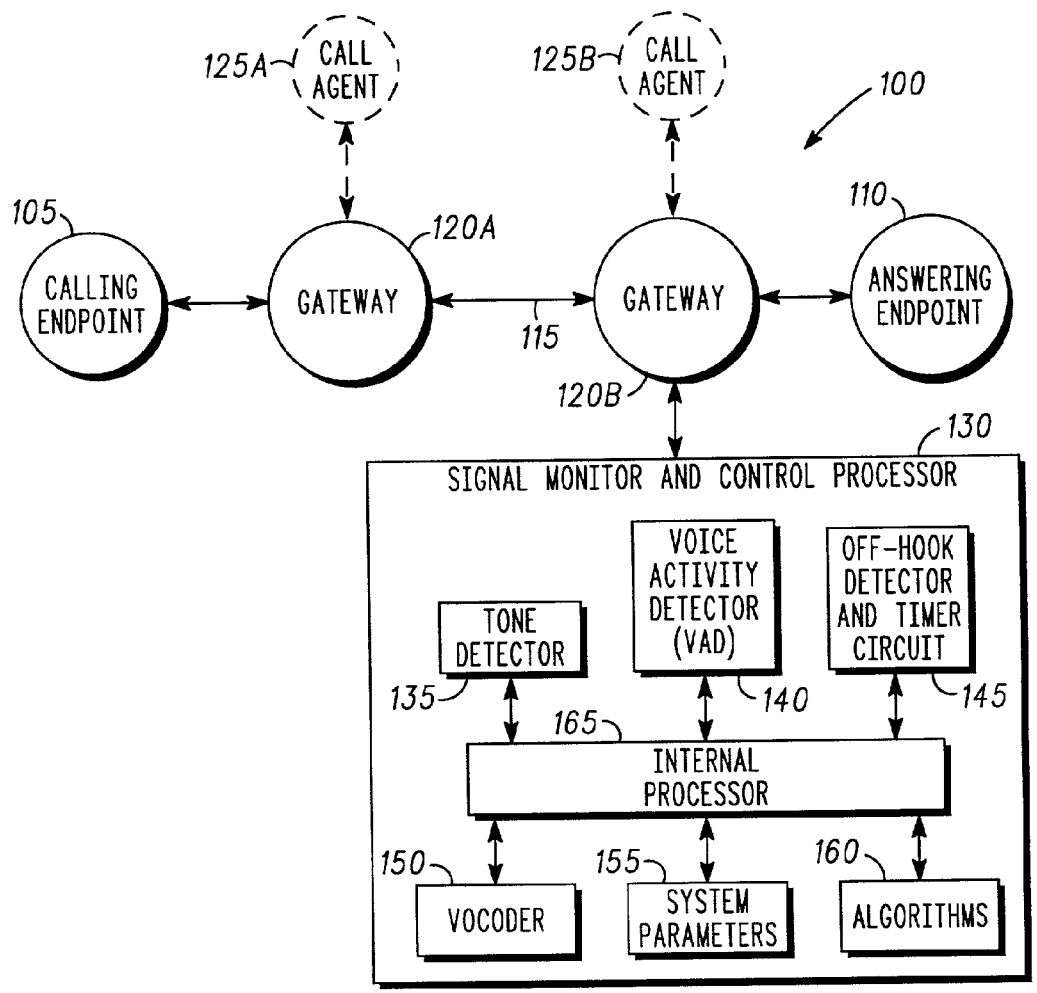
FIG. 1 is a block diagram of a communications system operating in accordance with the present invention.

FIG. 1 shows a communications system 100 (e.g., an Internet telephone system) for transporting voice as well as supporting modem and fax communication. The communications system 100 includes a calling endpoint 105 via which a call is placed to a terminal at answering endpoint 110 via communications link 115 and gateways 120A and 120B. The communications system 100 may optionally include one or more call agents 125A and 125B which process signaling information received from gateways 120A and 120B, respectively. The features of the present invention are incorporated into communications system 100 by means of a signal monitor and control processor 130, which is placed in communication with or incorporated within one of gateways 120A, 120B and/or call agents 125A, 125B.

The signal monitor and control processor 130 includes a tone detector 135, a voice activity detector (VAD) 140, an off-hook detector and timer 145, a wave/voice coder (hereinafter referred to a vocoder) 150, system parameters 155, and algorithms 160. System parameters 155 and algorithms 160 consist of variables, instructions and/or code which are stored in either an independent memory, or within an internal processor 165. The system parameters 155 include one or more detection criteria parameters which determine how tones that occur on communications link 115 are to be processed. The system parameters 155 also include one or more line transmission characteristic parameters which are used to optimize link 115 for the transmission of voice or tones. The internal processor 165 executes algorithms 160 and modifies system parameters 155 accordingly. The internal processor communicates with the tone detector 135, VAD 140, off-hook detector and timer circuit 145 and vocoder 150.

The communication system 100 reduces false modem and fax detection by using an estimate of time since pickup of an answering phone line to prevent false detection. The estimate can be performed by one of the gateways 120A, 120B or call agents 125A, 125B accessing and/or incorporating the features provided by signal monitor and control processor 130. The more accurately that the time can be measured or estimated, the more critically the modem/fax detection can be filtered. The line transmission characteristic parameters of system parameters 155 are used to optimize the audio characteristics for specific types of signals (i.e., payload) transmitted over communications link 115. The types of signals include modem and fax communication (operating in voice band), or human voice. The system parameters 155 control signal delay, echo cancellation, jitter buffer size, sample clocking adjustment strategy and wave/voice coder selection. The line transmission characteristic parameters of system parameters 155 are also used to specify the bandwidth of communications link 115. When a vocoder rate parameter is modified by internal processor 165, at least one algorithm (e.g., a rate or compression algorithm) implemented by voice coder 150 is adjusted.

When it is determined that fax or modem communications are occurring on communications link 115, it is desirable to minimize packet loss by using a longer jitter buffer, turn echo cancellation off, use a wave coder (e.g., such as G.711 or the like) and to use a sample clocking adjustment strategy that minimizes the impact of pulse code modulation (PCM) clock drift on the echo canceller of the modem. Parameters that are optimized for fax or modem communication are detrimental to the quality (or impose a high cost) of voice communication, and vice versa. When it is determined that voice activity is occurring on communications link 1115, it is desirable to have a low signal delay, echo cancellation on, a low rate vocoder and short or adaptive jitter buffers to minimize delay.

Figure 2:
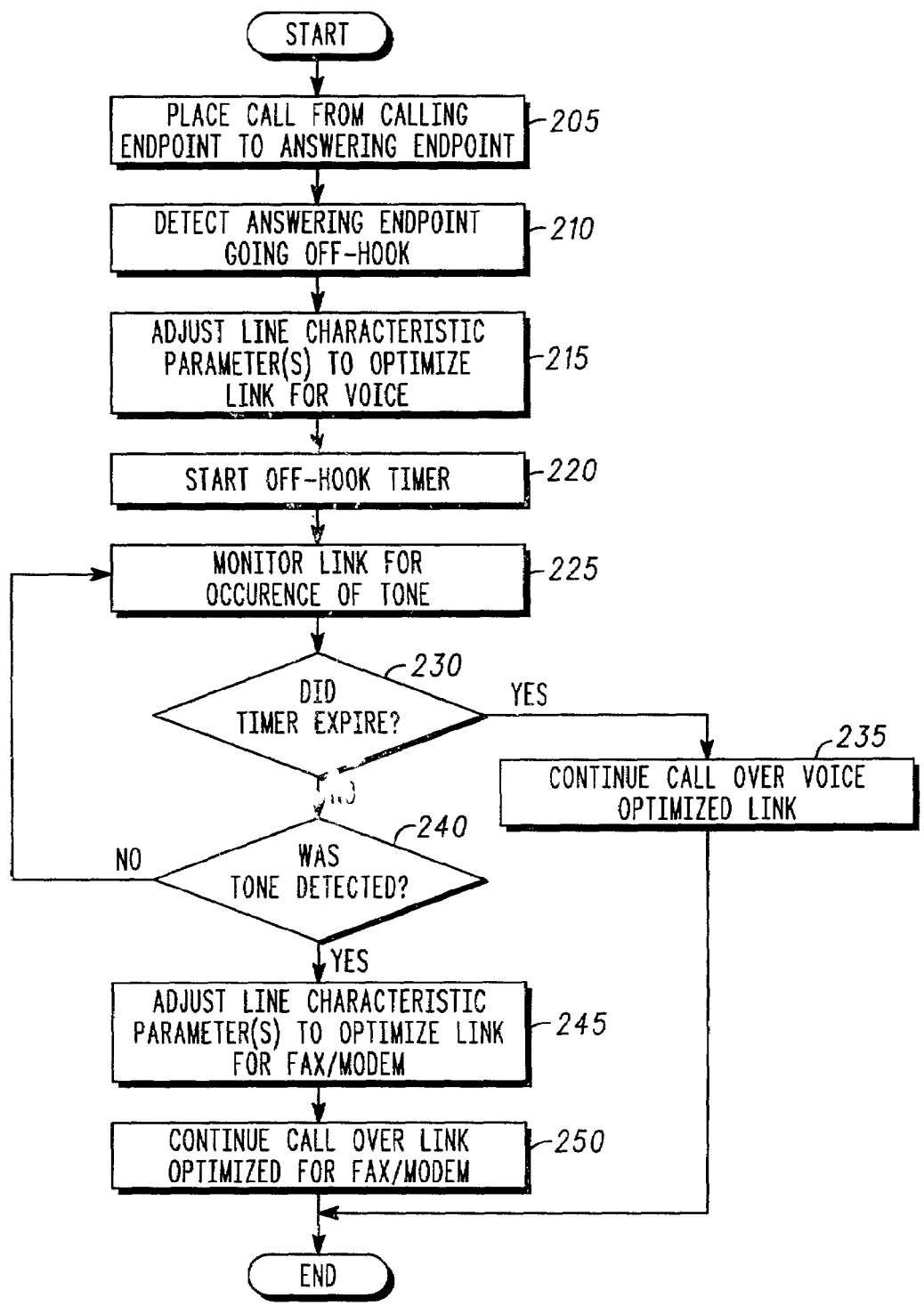
FIGS. 2–5 are high-level functional flowcharts including steps implemented by the communications system of FIG. 1.

FIG. 2 shows the steps implemented by a tone processing method executed by signal monitor and control processor 130 in accordance with a preferred embodiment of the present invention. In step 205, a call is placed over communications link 115 from calling endpoint 105 to answering endpoint 110, via gateways 120A and 120B. When answering endpoint 110 goes off-hook (step 210), at least one line transmission characteristic parameter of system parameters 155 is adjusted to optimize the communications link 115 for voice communications (step 215). In step 220, a timer in off-hook detector and timer circuit 145 begins to measure the elapse of time from when the answering endpoint 110 was detected to go off-hook. In step 225, the communications link 115 is monitored by tone detector 135 for the occurrence of at least one fax/modem tone (step 225). If the timer reaches a predetermined value (i.e., the timer expires) before a tone is detected to have occurred on the communications link 115 (step 230), the call continues over the voice optimized communications link 115 (step 235) until the call ends. If a tone is detected before the timer expires (step 240), at least one line transmission characteristic parameter of system parameters 155 is adjusted to optimize the communications link 115 for fax/modem operation (step 245). In step 250, the call continues over the communications link 115 optimized for fax/modem operation until the call ends.

Figure 3:
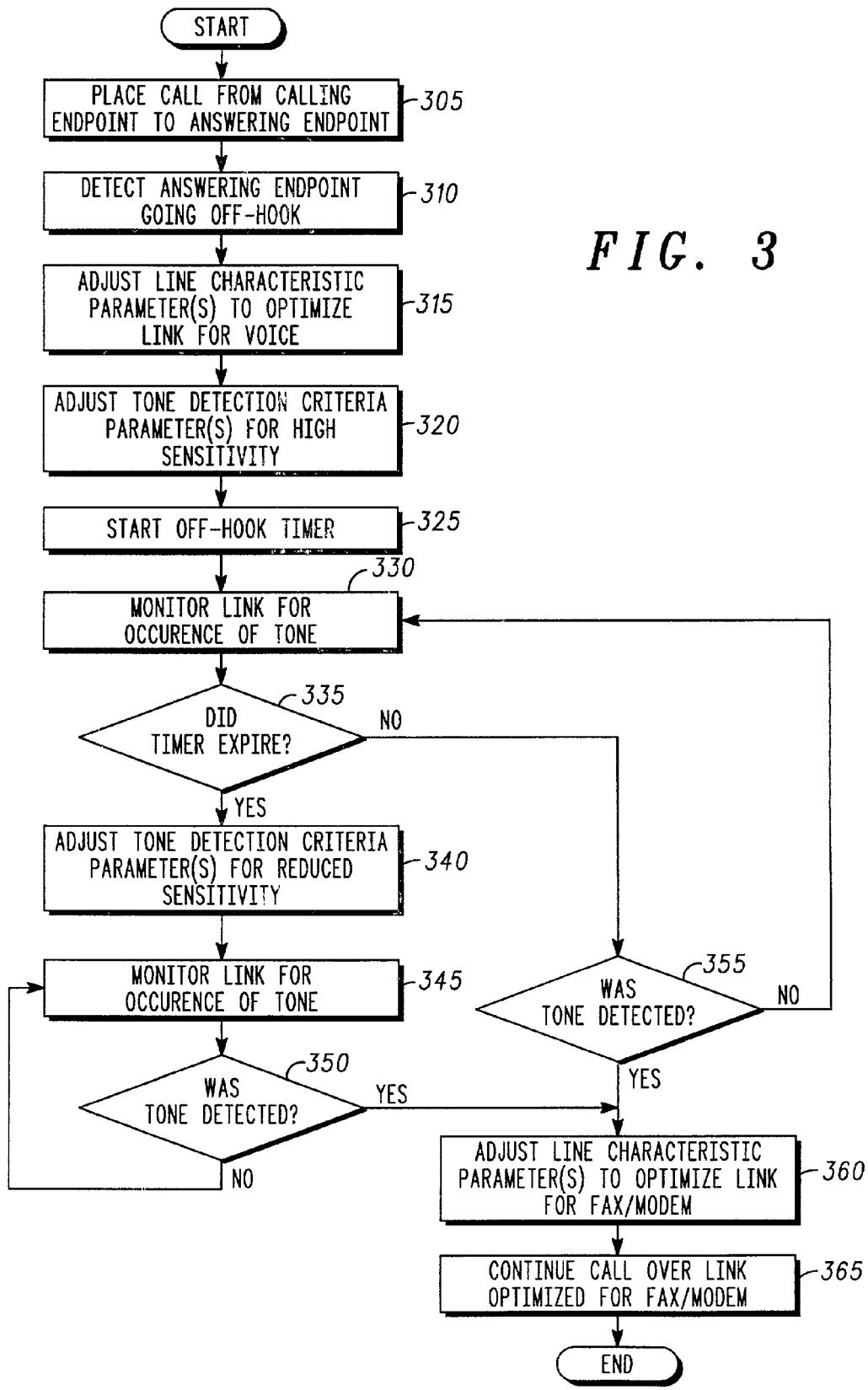

FIG. 3 shows the steps implemented by a tone processing method executed by signal monitor and control processor 130 in accordance with an alternate embodiment of the present invention. In step 305, a call is placed over communications link 115 from calling endpoint 105 to answering endpoint 110, via gateways 120A and 120B. When answering endpoint 110 goes off-hook (step 310), at least one line transmission characteristic parameter of system parameters 155 is adjusted to optimize the communications link 115 for voice communications (step 315). In step 320, at least one detection criteria parameter of system parameters 155 is adjusted and used in conjunction with one of algorithms 160, so that the detection of an occurrence of at least one tone transmitted on the communications link 115 by tone detector 135 is highly sensitive. In step 325, a timer in off-hook detector and timer circuit 145 begins to measure the elapse of time from when the answering endpoint 110 was detected to go off-hook. In step 330, the communications link 115 is monitored by a highly sensitive tone detector 135 for the occurrence of at least one fax/modem tone. If the timer expires (step 335), a detection criteria parameter of system parameters 155 is adjusted to reduce the sensitivity of the algorithm 160 used by tone detector 135 to detect the occurrence of at least one tone on the communications link 115 (step 340). In step 345, the communications link 115 is monitored by a less sensitive tone detector 135 for the occurrence of at least one tone on communications link 115. If a tone is detected after the sensitivity of algorithm 160 is reduced (step 350), or if the timer did not expire and the occurrence of at least one tone is detected on communications link 115 (step 355), at least one line transmission characteristic parameter of system parameters 155 is adjusted to optimize the communications link 115 for fax/modem operation (step 360). In step 365, the call continues over the communications link 115 optimized for fax/modem operation until the call ends.

Figure 4:
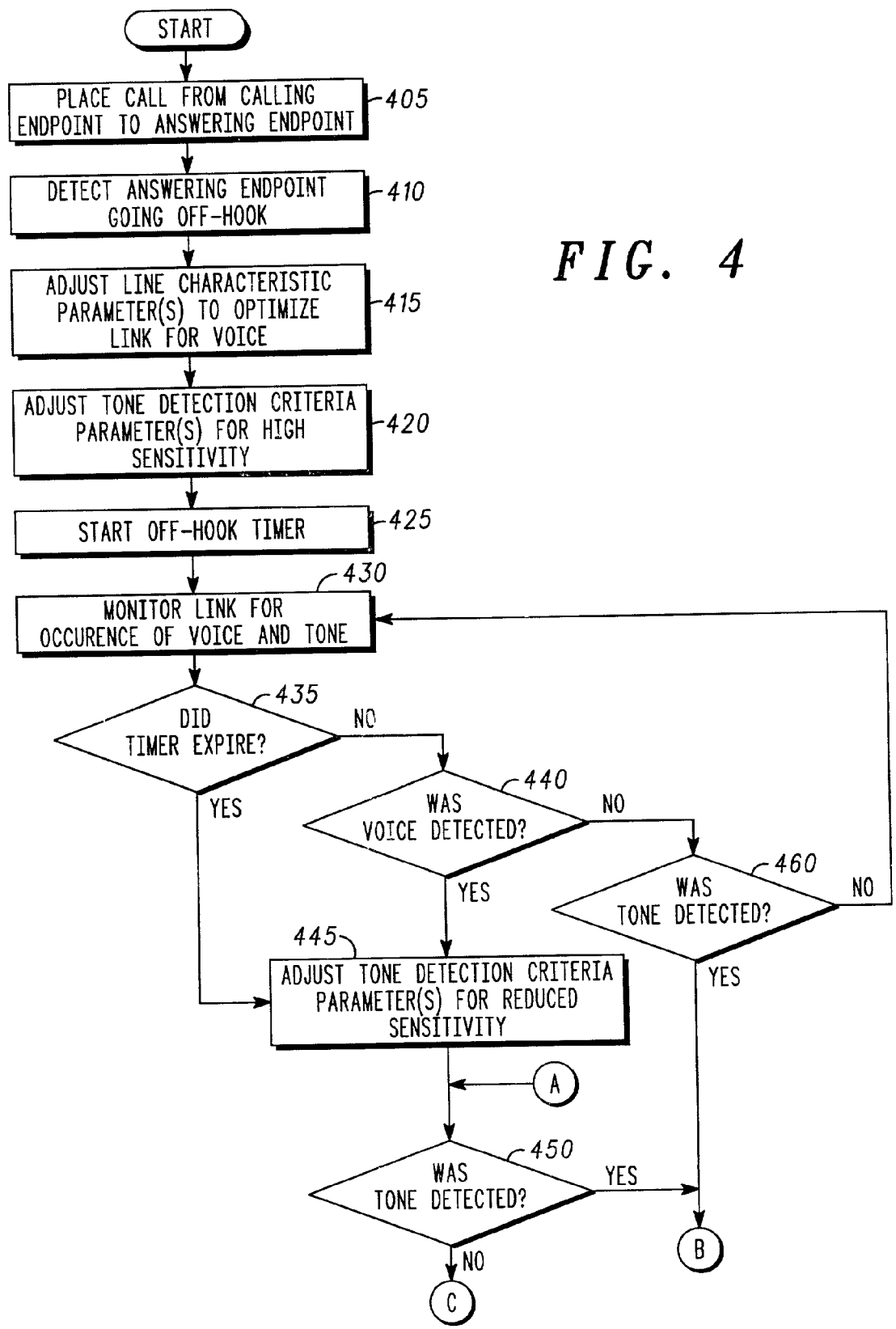
Figure 5:
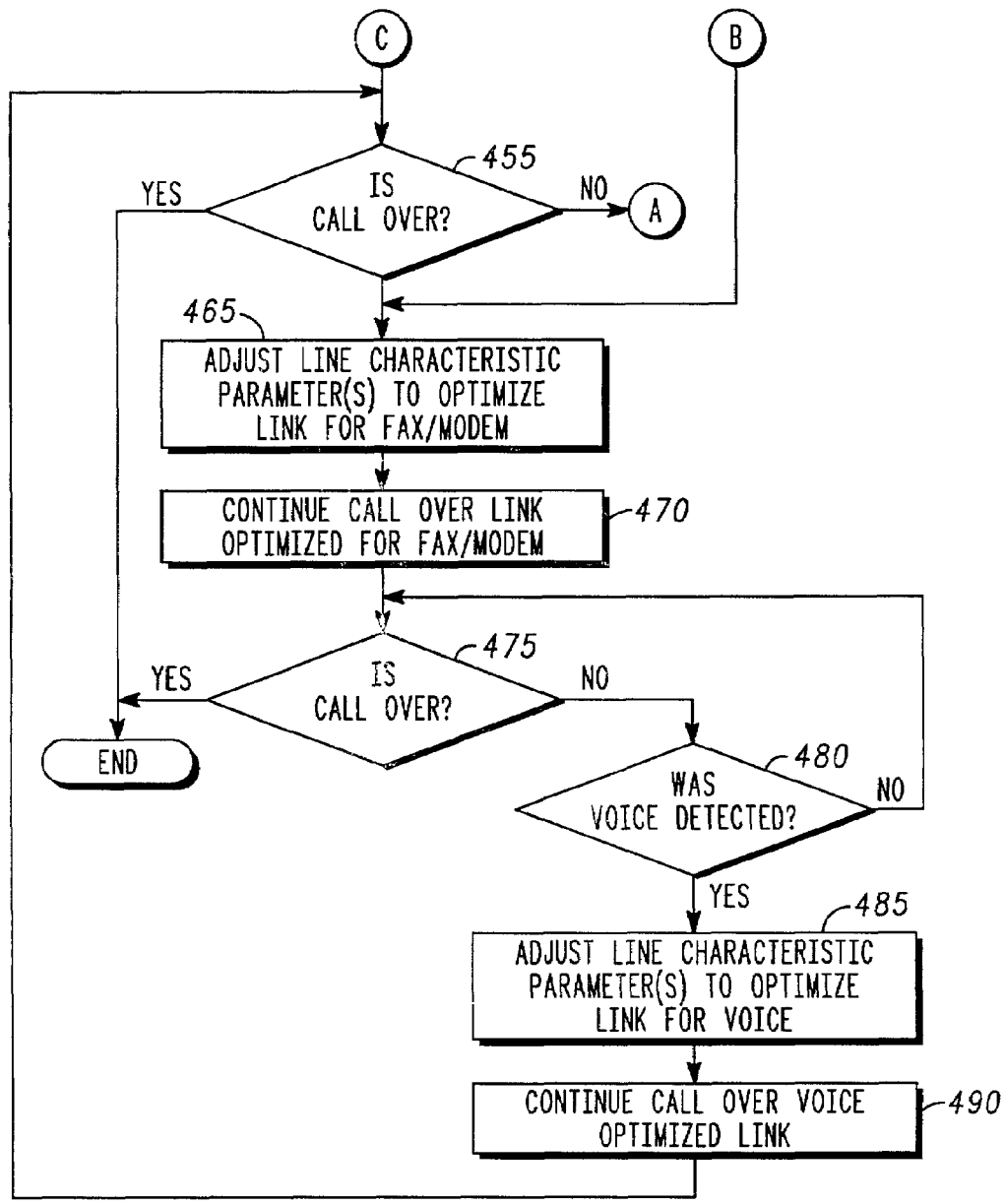

FIGS. 4 and 5 show the steps implemented by a tone detection method executed by signal monitor and control processor 130 in accordance with yet another embodiment of the present invention. In step 405, a call is placed over communications link 115 from calling endpoint 105 to answering endpoint 110, via gateways 120A and 120B. When answering endpoint goes off-hook (step 410), at least one line transmission characteristic parameter of system parameters 155 is adjusted to optimize the communications link 115 for voice communications (step 415). In step 420, at least one detection criteria parameter of system parameters 155 is adjusted and used in conjunction with one of algorithms 160, so that the detection of the occurrence of at least one tone transmitted on the communications link 115 by tone detector 135 is highly sensitive. In step 425, a timer in off-hook detector and timer circuit 145 begins to measure the elapse of time from when the answering endpoint 110 was detected to go off-hook. In step 430, the communications link 115 is monitored by both a voice activity detector (VAD) 140 and a highly sensitive tone detector 135 for the occurrence of voice activity and at least one fax/modem tone.

If the timer expires (step 435), or if voice activity is detected on communications link 115 by VAD 140 before the timer expires (step 440), a detection criteria parameter of system parameters 155 is adjusted to reduce the sensitivity of an algorithm 160 used by the tone detector 135 to detect the occurrence of at least one tone on the communications link 115 (step 445). For the remainder of the call, the monitoring of the communications link 115 for the occurrence of at least one tone is performed by a less sensitive tone detector 135 (step 450). If a tone is not detected by the less sensitive tone detector 135, a determination is made as to whether the call has ended (step 455).

If the timer did not expire (step 435) and voice activity was not detected on communications link 115 by VAD 140 (step 440), but the occurrence of at least one tone on communications link 115 by a highly sensitive tone detector 135 is detected (step 460), at least one line transmission characteristic parameter of system parameters 155 is adjusted to optimize the communications link 115 for fax/modem operation (step 465). Step 465 may also be implemented in response to a less sensitive tone detector 135 detecting the occurrence of at least one tone on communications link 115 (step 450). In step 470, the call continues over the communications link 115 optimized for fax/modem operation until the call ends, as determined by step 475. If, in step 475, it is determined that the call did not end and voice activity is detected by VAD 140 (step 480), at least one line transmission characteristic parameter of system parameters 155 is adjusted to optimize the communications link 115 for voice communications (step 485). In step 490, the call continues over the voice optimized communications link 115 until the call ends (step 455) or another tone is detected. Thus, system parameters 155 may be modified many different times during a single call to optimize the characteristics of the communications link 115 in accordance with the current type of communications occurring during the call.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of processing tones which occur on a communications link, the link connecting a calling endpoint to an answering endpoint, the method comprising:

(a) detecting the answering endpoint going off-hook in response to receiving a call from the calling endpoint;

(b) measuring the elapse of time from when the answering endpoint goes off-hook;

(c) monitoring the communications link for an occurrence of at least one tone; and (d) if the time reaches a predetermined value without the occurrence of at least one tone on the communications link, modifying at least one detection criteria parameter that is used to process tones that occur on the communications link.

2. The method of claim 1 wherein the modified detection criteria parameter causes tones that occur on the communications link to be ignored.

3. The method of claim 1 wherein the modified detection criteria parameter causes the sensitivity of detecting tones that occur on the communications link to be reduced.

4. The method of claim 1 further comprising:

(e) if at least one tone occurs on the communications link, adjusting a signal delay parameter associated with the transmission characteristics of the communications link, so as to optimize the communications link for fax/modem operation.

5. The method of claim 1 further comprising:

(e) if at least one tone occurs on the communications link, adjusting an echo cancellation parameter associated with the transmission characteristics of the communications link, so as to optimize the communications link for fax/modem operation.

6. The method of claim 1 further comprising:

(e) if at least one tone occurs on the communications link, adjusting a jitter buffer parameter associated with the transmission characteristics of the communications link, so as to optimize the communications link for fax/modem operation.

7. The method of claim 1 further comprising:

(e) if at least one tone occurs on the communications link, adjusting a vocoder rate parameter associated with a vocoder that detects voice activity on the communications link, so as to optimize the communications link for fax/modem operation.

8. The method of claim 1 further comprising:

(e) if at least one tone occurs on the communications link, adjusting a parameter associated with the bandwidth of the communications link, so as to optimize the communications link for fax/modem operation.

9. A communications system for processing tones that occur on a communications link, the link connecting a calling endpoint to an answering endpoint, the system comprising:

(a) an off-hook detector and timer circuit which (i) detects the answering endpoint going off-hook in response to receiving a call from the calling endpoint, and (ii) measures the elapse of time from when the answering endpoint goes off-hook;

(b) a tone detector which detects tones that occur on the communications link;

(c) a voice activity detector (VAD) which detects the occurrence of voice activity on the communications link; and (d) a processor, in communication with the off-hook detector and timer circuit, the tone detector, and the VAD, the processor executing an algorithm to modify at least one detection criteria parameter that is used to process tones that occur on the communications link.

10. The system of claim 9 wherein the algorithm instructs the processor to modify the detection criteria parameter if voice activity is detected by the VAD.

11. The system of claim 9 wherein the algorithm instructs the processor to modify the detection criteria parameter if the time reaches a predetermined value without the tone detector detecting a tone.

12. The system of claim 9 wherein the algorithm instructs the processor to modify the detection criteria parameter so that tones that occur on the communications link are processed differently than before the time reaches the predetermined value.

13. The system of claim 9 wherein the modified detection criteria parameter causes tones that occur on the communications link to be ignored.

14. The system of claim 9 wherein the modified detection criteria parameter causes the sensitivity of detecting tones that occur on the communications link to be reduced.

15. The system of claim 9 further comprising:

(e) a voice coder in communication with the processor, wherein the detection criteria parameter is modified to adjust at least one algorithm implemented by the voice coder.

16. The system of claim 9 wherein the communications system is an Internet telephone system.

* * * * *